C. F. PERRY.
BAIL.
APPLICATION FILED NOV. 3, 1914.
1,148,399.
Patented July 27, 1915.
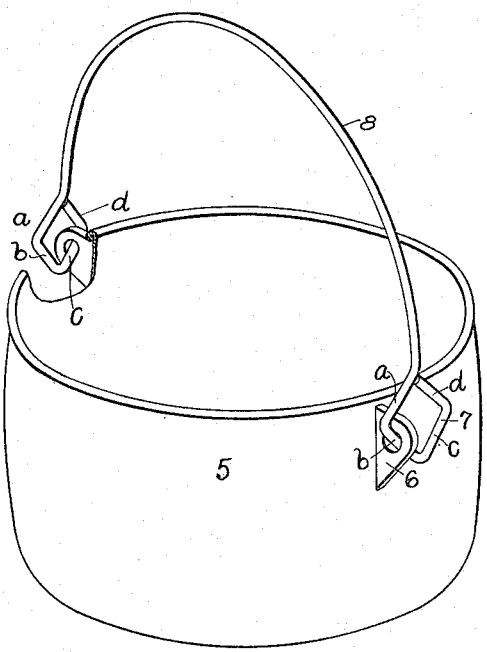
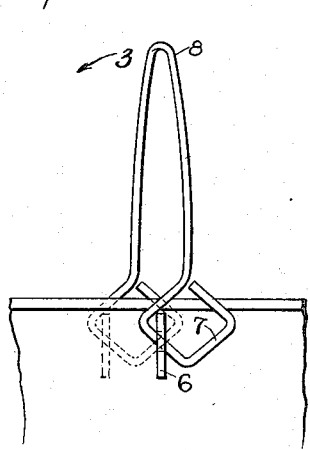
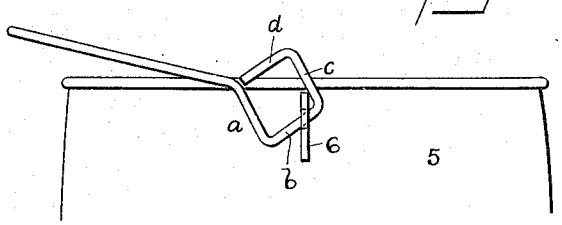
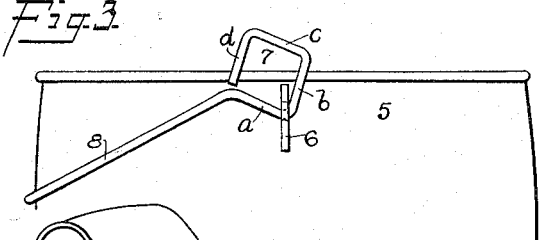
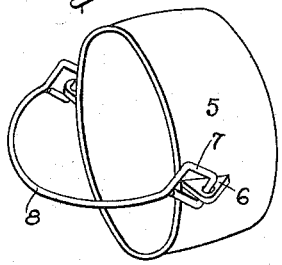
WITNESSES
George L. Blume.
INVENTOR
Charles French Perry
BY
ATTORNEYS ns.
UNITED STATES PATENT OFFICE.

CHARLES FRENCH PERRY, OF BANGOR, MAINE.

BAIL.

1,148,399.  Specification of Letters Patent.  Patented July 27, 1915.

Application filed November 3, 1914. Serial No. 870,038.

*To all whom it may concern:*

Be it known that I, CHARLES FRENCH PERRY, a citizen of the United States, and a resident of Bangor, in the county of Penobscot and State of Maine, have invented a new and Improved Bail, of which the following is a full, clear, and exact description.

My invention relates to bails for utensils of any kind, and particularly where it is desirable to provide a bail which can be maintained in predetermined fixed positions relative to the utensil.

An object of the invention is to provide a simple, convenient, strong and inexpensive bail, which can be placed in fixed predetermined positions relative to the utensil and whereby the utensil can be conveniently handled, particularly when the same is used for hot contents.

With the above and other objects in view, the nature of which will more fully appear as the description proceeds, the invention consists in the novel construction combination and arrangement of parts as herein fully described, illustrated and claimed.

In the accompanying drawings, forming part of the application, similar characters of reference indicate corresponding parts in all the views, and Figure 1 is a perspective view of a utensil provided with an embodiment of my invention, the bail being shown in one of its predetermined fixed positions; Fig. 2 is a side elevation of a utensil showing the bail in a different predetermined fixed position; Fig. 3 is the normal free position of the bail; Fig. 4 illustrates the position of the bail when it is desired to pour the contents out of the utensil; and Fig. 5 shows the position of the bail and utensil when pouring out hot contents from the utensil.

Referring to the drawings, 5 represents a utensil provided with laterally projecting ears 6 which are engaged by angular loops 7 of the bail 8. The loop 7 is preferably quadrilateral and forms an integral part of the bail. It lies in a plane at right angles to the plane of the bail, one of the diagonals of the quadrilateral being in the plane of the bail. The sides $a$, $b$, $c$, and $d$ of the loop are substantially equal. By engaging the upper part of the ears 6 of the utensil with the angles of the loops lying on opposite sides of the plane of the bail, as shown in Fig. 1, the bail will be locked in an upright position, that is, it will not fall to either side of the utensil. By engaging the upper parts of the ears 6 with the angle of the loop lying in the plane of the bail, the same will be locked in the position as shown in Fig. 2.

By engaging the angles of the loops lying on the same side of the plane of the bail with the upper part of the ears the bail is prevented from moving to one side of the utensil, while it is free to move to the other side, as can be easily seen from Fig. 4, where the arrow 3 indicates the direction of free movement of the bail. By pushing the bail in the direction of the arrow the same will fall to the position indicated in Fig. 3, that is, to the free position of the bail; but when it is desired to pour hot contents out of the utensil, the bail being maintained in the position as shown in Fig. 4, it can be turned to the position as indicated in Fig. 5, thus the finger maintaining the bail will be outside of the hot vapors coming from the utensil.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made as are within the scope of the appended claims.

Having thus described my invention, I claim as new and desire to secure by Letters Patent:

1. In combination with a utensil having apertured ears, a bail having quadrangular loops each engaging an ear, the corners of said loop being adapted to coöperate with the ear to maintain the bail in predetermined position.

2. In combination a utensil having ears disposed in a vertical plane, said ears having apertures, and a bail having quadrangular loops each engaging an aperture of the ear, the corners of said loops being adapted to coöperate with the ears to maintain the bail in predetermined positions.

3. In combination with a utensil having apertured ears disposed in a vertical plane, a bail having quadrangular loops each engaging an ear, the loops of the bail being in a plane at right angles to the plane of the bail, one of the diagonals of the quadrangular loop being in the plane of the bail, the corners of the loops being adapted to coöperate with the ear engaged thereby to maintain the bail in predetermined position, substantially as and for the purpose set forth.

In testimony whereof I have signed my name to this specification in the presence of two subscribing witnesses.

CHARLES FRENCH PERRY.

Witnesses:
P. H. CROWELL,
T. P. CRONAN.

Copies of this patent may be obtained for five cents each, by addressing the "Commissioner of Patents. Washington, D. C."